United States Patent
Li et al.

(10) Patent No.: US 6,726,146 B2
(45) Date of Patent: Apr. 27, 2004

(54) MULTIPLE MODEL TARGET TRACKING WITH VARIABLE SAMPLING RATE

(75) Inventors: Luowen Li, Singapore (SG); Chian Poh Lam, Singapore (SG)

(73) Assignee: Singapore Technologies Aerospace Limited (SG)

( * ) Notice: Subject to any disclaimer, the term of this patent is extended or adjusted under 35 U.S.C. 154(b) by 0 days.

(21) Appl. No.: 10/424,365

(22) Filed: Apr. 25, 2003

(65) Prior Publication Data

US 2004/0025679 A1 Feb. 12, 2004

(51) Int. Cl.[7] ............................................... F41G 7/00
(52) U.S. Cl. .................. 244/3.15; 244/3.1; 244/3.16; 244/3.19; 342/61; 342/62; 342/63; 342/175; 342/195
(58) Field of Search ................. 244/3.1–3.3; 342/61–67, 342/73–81, 89–103, 175, 195; 701/200, 201, 207–226, 300, 302

(56) References Cited

U.S. PATENT DOCUMENTS

| | | | | |
|---|---|---|---|---|
| 4,405,985 A | * | 9/1983 | Hall et al. | ................. 244/3.11 |
| 4,589,610 A | * | 5/1986 | Schmidt | .................... 244/3.19 |
| 5,001,647 A | * | 3/1991 | Rapiejko et al. | ............. 244/3.2 |
| 6,087,974 A | * | 7/2000 | Yu | ............................... 342/62 |
| 6,142,412 A | * | 11/2000 | De Sa et al. | ............... 244/3.16 |

OTHER PUBLICATIONS

G.A. Watson et al.; "Interacting Acceleration Compensation Algorithm for Tracking Maneuvering Targets"; IEEE Publication 0–7803–0934–0/93/$3.00; 1993.*

E. Mazor et al.; "Interacting Multiple Model Methods in Target Tracking: A Survey"; IEEE Trans. on Aerospace and Electronic Systems; vol. 34, No. 2, Jan. 1998.*

S.M. Hong, "Manoeuvre Detection for Non–uniform Sampling Intervals"; Taegu, Korea; May 22, 1998.*

Samuel Blackman and Robert Popoli, "Design and Analysis of Modern Tracking Systems", (1999), pp. 221–225.

* cited by examiner

Primary Examiner—Bernarr E. Gregory
(74) Attorney, Agent, or Firm—Moore & Van Allen PLLC; Michael G. Johnston

(57) ABSTRACT

A method of maneuvering target tracing is disclosed. The present invention relates to the field of target tracking and more generally to a method of employing multiple model and variable sampling rate technique, which achieve good tracking performance for a high-g maneuvering target. The results show that the present invention can handle the missile sudden maneuver better and are accurate.

4 Claims, 2 Drawing Sheets

Position RMSE of MIMM and VMIMM.

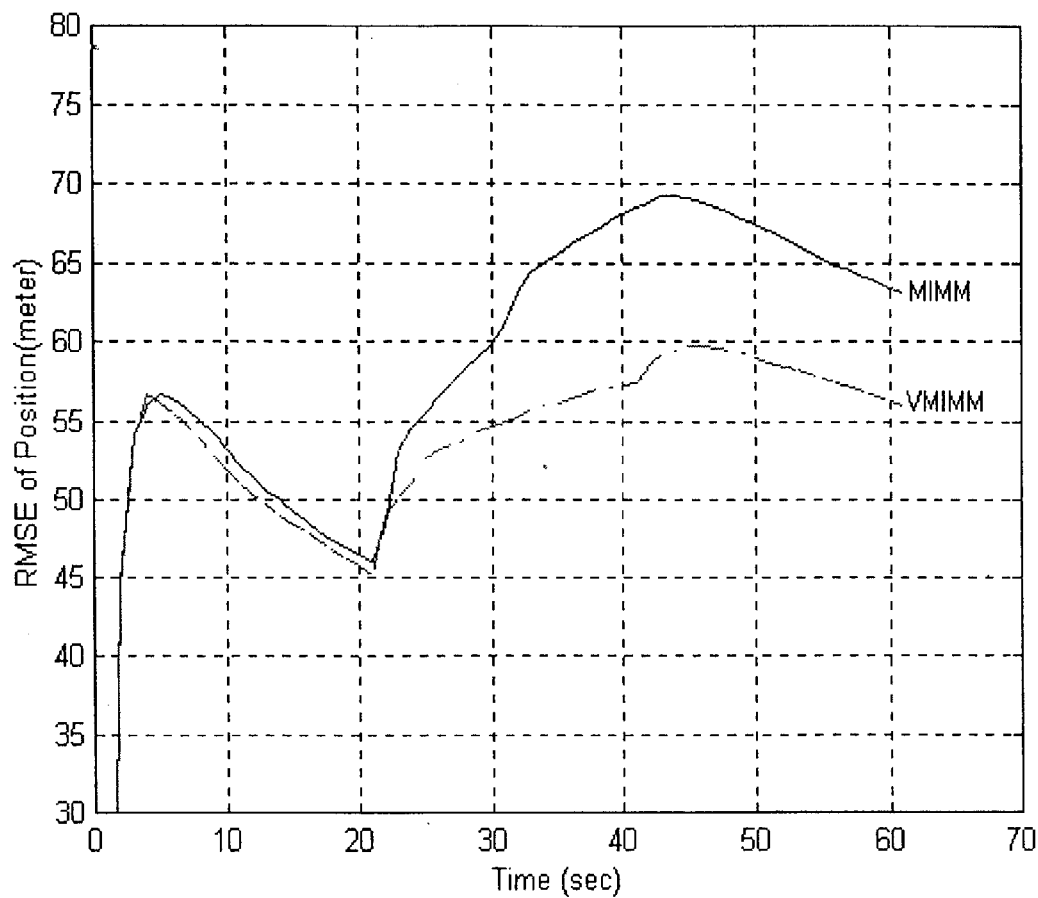
Figure 1: Position RMSE of MIMM and VMIMM.

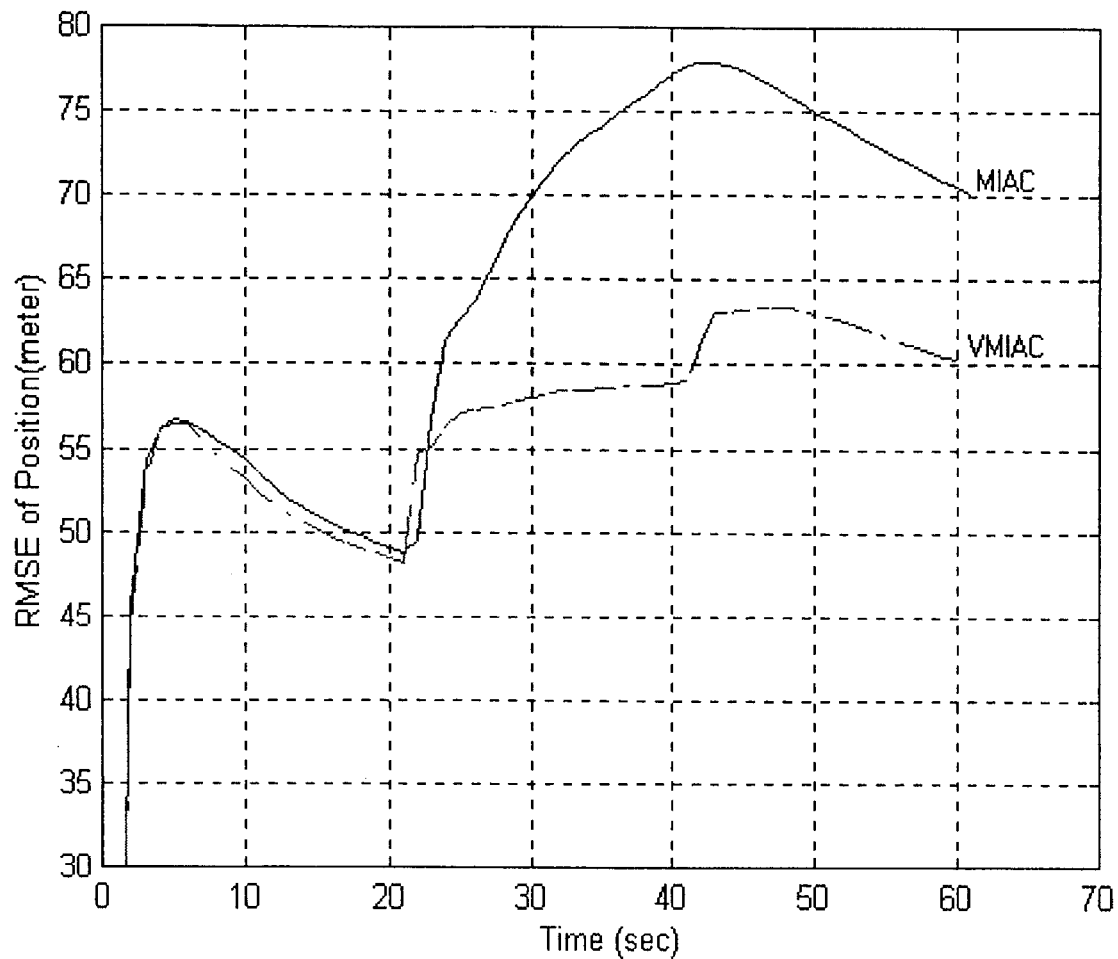
Figure 2: Position RMSE of MIAC and VMIAC.

MULTIPLE MODEL TARGET TRACKING WITH VARIABLE SAMPLING RATE

BACKGROUND OF THE INVENTION (a) Technical Field of the Invention

The present invention relates the field of target tracking and more generally to a method employing multiple model and variable sampling rate technique, which achieve good tracking performance for the high-g maneuvering missile targets.

(b) Description of the Prior Art

For tactical situation awareness and threat assessment in modern battlefield, target tracking is one of the most important areas of concern, especially in missile tracking (eg. Air-to-Air (A/A), Air-to-Ground (A/G), etc.). Missile maneuvers have high g which can range up to 50 g (e.g. Missile loaded by Eurofighter Typhoon) and are extremely unpredictable. The conventional Kalman filter is widely used as a target tracking technique, however it is not capable of handling such high-g maneuvering targets and may cause track loss during high-g missile maneuvering.

The use of the Interacting multiple Model (IMM) algorithm and the Interacting Acceleration (IAC) algorithm in target tracking gives better performance than the Kalman filter. This has been disclosed in "INTERACTING MULTIPLE MODEL METHODS IN TARGET TRACKING: A SURVEY", IEEE Transactions on Aerospace and Electronic Systems, Vol. 34, No. 1 January 1998, by E. Mazor, A. Averbuch, Y. Bar-Shalom and J. Dayan, and "INTERACTING ACCELERATION COMPENSATION ALGORITHM FOR TRACKING MANEUVERING TARGETS", IEEE Transactions on Aerospace and Electronic Systems, Vol. 31, No. 2 July 1995, by G. Watson and W. Blair. These multiple model methods have attracted increasing applications in Air Traffic Control (ATC), Missile Launch Envelop (MLE) and Dynamic Launch Zone (DLZ) systems in the recent years.

In the applicant's previous patent (Singapore application number 200102213-6), the Interacting Multiple Model (IMM) and the Interacting Acceleration Compensation (IAC) algorithms for maneuvering targets have been modified to achieve significantly better tracking performances. In the present invention, by combining the variable sampling rate method with the Modified Interacting Multiple Model (MIMM) and the Modified Interacting Acceleration Compensation (MIAC) algorithms respectively, the tracking performance of the MIMM and MIAC for high-g maneuvering targets, especially for the A/A and A/G missile targets tracking, will be further improved.

SUMMARY OF THE INVENTION

Accordingly, it is an object of the present invention to provide a high-g, maneuvering missile tracking method by combining the variable sampling rate method with the MIMM algorithm to formulate the VMIMM tracking algorithm, wherein the variable sampling rates are introduced according to target maneuvering detection which is related to adaptive factor, $\xi$.

Also, another object of the present invention is to provide a high-g maneuvering missile tracking method by combining the variable sampling rate method with the MIAC algorithm to formulate the VMIAC tracking algorithm, wherein variable sampling rates are introduced according to target maneuvering detection which is related to adaptive factor, $\zeta$.

A further object of the present invention is to provide a maneuvering missile tracking method by combining the variable sampling rate method with the MIMM and the MIAC algorithms respectively, wherein simulation results show that the modified algorithms perform better than the original algorithms.

BRIEF DESCRIPTION OF THE DRAWINGS

FIG. 1 is a graph schematically showing the position RMSE of the VMIMM and MIMM algorithm of the present invention.

FIG. 2 is a graph schematically showing the position RMSE of VMIAC and MIAC algorithm of the present invention.

DETAILED DESCRIPTION OF THE PREFERRED EMBODIMENT

In accordance with the present invention, the details of the Interacting Multiple Model (IMM) and the Interacting Acceleration Compensation (IAC) algorithms can be found in the reference, "INTERACTING MULTIPLE MODEL METHODS IN TARGET TRACKING: A SURVEY". Also, the MIMM and MIAC algorithms can be found in the applicant's previous patent application titled "A MANEUVERING TARGET TRACKING METHOD VIA MODIFYING THE INTERACTING MULTIPLE MODEL (IMM) AND THE INTERACTING ACCELERATION COMPENSATION (IAC) ALGORITHMS" (Singapore application no. 200102213-6). In the present invention, the variable sampling rate method will be incorporated into the MIMM and MIAC to formulate the VMIMM and the VMIAC tracking algorithms respectively.

To combine variable sampling technique with MIMM and MIAC algorithms, the following steps are employed: Firstly, before the maneuver is detected, missile is assumed as moving with nearly constant speed. The sampling rate selected will be slower.

When the maneuver is detected by normalized innovation and range rate residual, the sampling rate selected is increased and the adaptive factors in the MIMM and MIAC filters are scaled up.

The target moving model is designed into 2 segments—constant speed and maneuvering. The simulation test is performed such that the sampling rate will only change while the target maneuvering is detected. For example, the sampling rate will be doubled while the target maneuvering in comparison to the constant speed segment. This will increase computation cost as the faster sampling rate produce more data in the maneuvering segment. When the target is in constant speed, the sampling rate is reduced to match the non-maneuver target state and thus reduce computation cost.

In the VMIMM algorithm, the Innovation Covariance $S^j$ (k) is described by the following equation:

$$S^j(k) = H^j(k)[P^j(k-1|k-1) + \xi \times Q^j(k)]H^j(k)^T + R^j(k)$$

where $H^j$ (k) is the measurement matrix, $P^j$(k−1|k−1) is the state prediction covariance, $R^j$ (k) is the measurement noise covariance, $\xi^j$ is the adaptive factor and $Q^j$ (k) is the process noise covariance. As the target moves into maneuvering state from constant speed state, sampling rate is increased. Also, upon detection of target maneuvering by normalized innovation and range rate residual, adaptive factor $\xi^j$ is increased to scale up process noise covariance $Q^j$ (k) such that the innovation covariance $S^j$ (k) is increased to adapt to the maneuvering state. Conversely, as the target moves from maneuvering state into constant speed state, the reverse happens.

In the VMIAC algorithm (bias-free model), bias-free Innovation covariance S(k) is described by the following equation:

$$S(k)=H(k)[P(k-1 \mid k-1)+\xi \times Q(k)]H(k)^T+R(k)$$

where H(k) is the measurement matrix, P(k−1|k−1) is the state prediction covariance, R(k) is the measurement noise covariance, $\xi$ is the adaptive factor and Q(k) is the process noise covariance. As the target moves into maneuvering state from constant speed state, sampling rate is increased. Also, upon detection of target maneuvering by normalized innovation and range rate residual, adaptive factor $\xi$ is increased to scale up process noise covariance Q(k) such that the innovation covariance S(k) is increased to adapt to the maneuvering state. Conversely, as the target moves from maneuvering state into constant speed state, the reverse happens.

In the VMIAC algorithm (bias model), bias model innovation covariance $\Sigma(k|k-1)$ is described by the following equation:

$$\Sigma(k|k-1)=\Sigma(k-1|k-1)+\zeta \times G^b (k-1) Q^b (k-1) G^b (k-1)^T$$

wherein $\zeta$ is the adaptive factor and $Q^b$ (k−1) is the bias model process noise covariance. As the target moves into maneuvering state from constant speed state, sampling rate is increased. Also, upon detection of target maneuvering by normalized innovation and range rate residual, adaptive factor $\zeta$ is increased to scale up process noise covariance $Q^b$ (k−1) such that the innovation covariance $\Sigma(k|k-1)$ is increased to adapt to the maneuvering state. Conversely, as the target moves from maneuvering state into constant speed state, the reverse happens.

The performance comparison of MIMM and VIMM, MIAC and VMIAC will be described hereinafter. In accordance with the preferred embodiment of the present invention, for simplicity, all the algorithms each contained 2 models: a constant velocity (CV) model and a constant acceleration (CA) model. The tracking performances of the MIMM and the VMIMM, MIAC and the VMIAC algorithms were checked against the simulated target trajectories with 23 g and 25 g maneuvers respectively. FIG. 1 is the position RMSE comparison of MIMM(solid line) and VMIMM (dash line). Both figures show that the improved algorithms which applied the variable sampling rate technique have better performances.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A method of maneuvering target tracking by combining Variable Sampling Rate Technique with Modified Interacting Multiple Model algorithm having the innovation covariance $S^j$ (k)=$H^j$ (k)[$P^j$ (k−1 |k|1)+$\xi^j$ ×$Q^j$ (k)]$H^j$ (k)$^T$ +$R^j$ (k), $S^j$ (k) being the innovation covariance, $H^j$ (k) being the measurement matrix, $P^j$ (k−1 |k−1) being the state prediction covariance, $R^j$ (k) being the measurement noise covariance, $\xi^j$ is the adaptive factor and $Q^j$ (k) is the process noise covariance, comprising the steps of:

(a) increasing sampling rate when target is in high-g maneuvering state and increasing adaptive factor $\xi^j$ to scale up process noise covariance $Q^j$ (k) such that the innovation covariance $S^j$ (k) is increased to adapt to the high-g maneuvering state; and (b) decreasing sampling rate when target is in constant speed and decreasing adaptive factor $\xi^j$ to scale down process noise covariance $Q^j$ (k) such that the innovation covariance $S^j$ (k) is decreased to adapt to the constant speed state.

2. The method according to claim 1, wherein the normalized innovation and the range rate residual are used to detect target high-g maneuvering state and in turn scale up the adaptive factor $\xi^j$.

3. A method of maneuvering target tracking by combining Variable Sampling Rate Technique with Interacting Acceleration Compensation algorithm, in bias-free model with innovation covariance S(k)=H(k)[P(k−1 |k−1)+$\xi$×Q(k)]H(k)$^T$ +R(k), S(k) being the innovation covariance, H(k) being the measurement matrix, P(k−1 |k−1) being the state prediction covariance, R(k) being the measurement noise covariance, $\xi$ being the adaptive factor and Q(k) being the process noise covariance comprising the steps of:

(i) increasing sampling rate when target is in high-g maneuvering state and increasing adaptive factor $\xi$ to scale up process noise covariance Q(k) such that the innovation covariance S(k) is increased to adapt to the high-g maneuvering state;

(ii) decreasing sampling rate when target is in constant speed and decreasing adaptive factor $\xi$ to scale down process noise covariance Q(k) such that the innovation covariance S(k) is decreased to adapt to the constant speed state; and (iii) employing normalized innovation and range rate residual to detect target high-g maneuvering state and in turn scale up the adaptive factor $\xi$.

4. A method of maneuvering target tracking by combining Variable Sampling Rate Technique with Interacting Acceleration Compensation algorithm in bias model with innovation covariance $\Sigma(k|k-1)=\Sigma(k-1 |k-1)+\zeta \times G^b(k-1) Q^b$ (k−1) $G^b$ (k−1)$^T$, $\Sigma(k|k-1)$ being the bias model innovation covariance, $\zeta$ being the adaptive factor and $Q^b$ (k−1) being the bias model process noise covariance, comprising the steps of:

(i) increasing sampling rate when target is in high-g maneuvering state and increasing adaptive factor $\zeta$ to scale up process noise covariance. $Q^b$ (k−1) such that the innovation covariance $\Sigma(k|k-1)$ is increased to adapt to the high-g maneuvering state;

(ii) decreasing sampling rate when target is in constant speed and decreasing adaptive factor $\zeta$ to scale down process noise covariance $Q^b$ (k−1) such that the innovation covariance $\Sigma(k|k-1)$ is decreased to adapt to the constant speed state; and (iii) employing normalized innovation and range rate residual to detect target high-g maneuvering state and in turn scale up the adaptive factor $\zeta$.

* * * * *